(12) United States Patent
Sakanaka et al.

(10) Patent No.: US 8,449,418 B2
(45) Date of Patent: May 28, 2013

(54) HIGH-LOAD DRIVE V-BELT

(75) Inventors: Hiroyuki Sakanaka, Kobe (JP); Mitsuhiko Takahashi, Kobe (JP); Masahiro Inukai, Kobe (JP)

(73) Assignee: Bando Chemical Industries, Ltd., Hyogo (JP)

( * ) Notice: Subject to any disclaimer, the term of this patent is extended or adjusted under 35 U.S.C. 154(b) by 562 days.

(21) Appl. No.: 12/672,843

(22) PCT Filed: Jul. 24, 2008

(86) PCT No.: PCT/JP2008/001982
§ 371 (c)(1), (2), (4) Date: Feb. 9, 2010

(87) PCT Pub. No.: WO2009/019821
PCT Pub. Date: Feb. 12, 2009

(65) Prior Publication Data
US 2010/0167859 A1    Jul. 1, 2010

(30) Foreign Application Priority Data
Aug. 7, 2007   (JP) ................................. 2007-205168

(51) Int. Cl.
*F16G 1/21*   (2006.01)

(52) U.S. Cl.
USPC ............................ 474/242; 474/240; 474/244

(58) Field of Classification Search
USPC .................. 474/238, 242, 240, 244
See application file for complete search history.

(56) References Cited

U.S. PATENT DOCUMENTS

| 6,283,882 B1 * | 9/2001 | Nonaka et al. ................. 474/242 |
| 6,293,886 B1 | 9/2001 | Ohkawa et al. |
| 2004/0033855 A1 * | 2/2004 | Inukai et al. .................... 474/242 |
| 2005/0113200 A1 * | 5/2005 | Okuno et al. ................. 474/266 |

FOREIGN PATENT DOCUMENTS

| JP | 5-3692 U | 1/1993 |
| JP | 2972104 B2 | 8/1999 |
| JP | 2000-120796 A | 4/2000 |
| JP | 2001-3994 A | 1/2001 |
| JP | 2003-194167 A | 7/2003 |
| JP | 2004-28156 A | 1/2004 |
| JP | 2004-144110 A | 5/2004 |
| JP | 2005-36976 A | 2/2005 |

OTHER PUBLICATIONS

JP2004-144110A English Translation.*

(Continued)

*Primary Examiner* — William E Dondero
*Assistant Examiner* — Minh Truong
(74) *Attorney, Agent, or Firm* — Roberts Mlotkowski Safran & Cole, P.C.

(57) ABSTRACT

The present invention aims at improving the shock resistance of a block without lowering the power transmission property or the wear resistance of a belt while suppressing the separation of the contact portion off of the reinforcing member. A high-load drive V-belt B includes: at least one tension band 10 extending in an endless loop; and a plurality of blocks 20 engaged and secured to the tension band 10 at a predetermined pitch in a belt length direction of the tension band 10, wherein the plurality of blocks 20 are each formed by a reinforcing member 27 and a resin on both sides of the reinforcing member 27 in a belt width direction, and each include a contact portion 28 having a contact surface 30 to be in contact with a pulley, and a thickness w of the contact portion 28 in a direction perpendicular to the contact surface 30 is set to 1.0 mm or more and 1.8 mm or less.

1 Claim, 6 Drawing Sheets

OTHER PUBLICATIONS

Partial English Translation of Japanese Patent Publication No. 2005-36976, published Feb. 10, 2005.

Notice of Appeal Decision issued by the Japanese Patent Office in corresponding Japanese Patent Application No. 2007-205168 mailed Mar. 23, 2010.

International Search Report for PCT/JP2008/001982 mailed Aug. 26, 2008.

Notice of Reasons for Rejection issued by Japanese Patent Office in corresponding Japanese Patent Application No. 2007-205168 mailed Aug. 26, 2008.

Decision of Rejection issued by Japanese Patent Office in corresponding Japanese Patent Application No. 2007-205168 mailed Feb. 3, 2009.

* cited by examiner

FIG.7

| | Thickness of contact portion (mm) | Modulus of elasticity of contact portion (MPa) | Shock resistance (rep) | | Power transmission property (N) | | High-speed durability (hrs) | Wear of block (mm) |
|---|---|---|---|---|---|---|---|---|
| | | | Initial | After run | Initial | After run | | |
| Example1 | 1 | 20000 | 5000 | 3000 | 3000 | 3000 | 500 OK-STOP | 0.40 |
| Example2 | 1.2 | 20000 | 6500 | 5500 | 3000 | 3000 | 500 OK-STOP | 0.41 |
| Example3 | 1.5 | 20000 | 5000 | 5000 | 3000 | 3000 | 500 OK-STOP | 0.42 |
| Example4 | 1.8 | 20000 | 5500 | 5500 | 3000 | 3000 | 500 OK-STOP | 0.42 |
| Comparative Example1 | 0.3 | 20000 | 200 | — | 2000 | 1800 | 350 Aluminum exposed | Aluminum exposed |
| Comparative Example2 | 0.5 | 20000 | 2500 | 80 | 2500 | 2000 | 400(Block broken) | 0.40 |
| Comparative Example3 | 0.8 | 20000 | 4500 | 800 | 3000 | 2500 | 500 OK-STOP | 0.41 |
| Comparative Example4 | 2.0 | 20000 | 5500 | 5000 | 3000 | 3000 | 400(Block broken) | 0.63 |

# HIGH-LOAD DRIVE V-BELT

TECHNICAL FIELD

The present invention relates to a high-load drive V-belt.

BACKGROUND ART

Currently, belt-type continuously variable transmissions have been developed as driving transmissions for automobiles. A belt-type continuously variable transmission includes a V-belt wrapped around transmission pulleys provided on a drive shaft and a driven shaft with a variable gap interval therebetween. That is, the belt-type continuously variable transmission is capable of continuously changing the speed by changing the gap interval between the transmission pulleys.

As the V-belt wrapped around the belt-type continuously variable transmission, a high-load drive V-belt is known in the art, which includes at least one tension band extending in an endless loop, and a plurality of blocks engaged and secured thereto at a predetermined pitch in the belt length direction.

The high-load drive V-belt is provided with a plurality of outer receiving portions and inner receiving portions arranged in the belt length direction on the belt outer periphery surface side of the tension band and on the belt inner periphery surface side of the tension band, respectively. Each block is provided with an outer mating portion mating with the outer receiving portion and an inner mating portion mating with the inner receiving portion. With such a configuration, the plurality of blocks can be engaged and secured to the tension band.

The block includes a reinforcing member buried in a resin member. That is, the block includes the reinforcing member, and a contact portion having a contact surface to be in contact with a pulley and formed on each of the opposite side surfaces of the reinforcing member in the belt width direction. Note that the contact portion is formed by a resin.

The high-load drive V-belt transfers the driving force from a pulley to the tension band via the contact portion so that the power is transmitted by the tension band. Typically, the contact portion of the high-load drive V-belt is formed by a resin of a relatively high modulus of elasticity so as to efficiently transfer the driving force from the pulley to the tension band to thereby improve the power transmission property.

The thickness of the contact portion reduces through the wear of the contact surface during a run. Therefore, if the thickness of the contact portion in the direction perpendicular to the contact surface (hereinafter referred to simply as "the thickness of the contact portion") is too small, the reinforcing member is exposed as the contact portion wears during a run so that the reinforcing member and the pulley may come into direct contact with each other. If the reinforcing member and the pulley come into direct contact with each other, the belt will be significantly damaged, thereby shortening the lifetime of the belt.

On the other hand, if the thickness of the contact portion is too large, there will be a relatively large shear stress at the interface between the reinforcing member and the contact portion during a belt run, and the contact portion may come off of the reinforcing member, thereby breaking the block. Therefore, in the prior art, in order to suppress the shear stress at the interface between the reinforcing member and the contact portion as much as possible while taking into consideration the wear from a belt run, the thickness of the contact portion is set to be as small as possible within a range that is greater than the wear from a belt run, e.g., 0.5 mm or more and 0.8 mm or less.

In the prior art, there is a demand for improving the wear resistance of the contact portion of such a high-load drive V-belt as described above. For this, Patent Document 1 is known in the art.

In Patent Document 1, the contact portion of a block of a high-load drive V-belt is formed by a phenol resin material containing a carbon fiber, wherein the carbon fiber is such that the thickness of the crystal layer is 25 angstroms or more and 200 angstroms or less in an onion structure. Thus, the flexural strength and the flexural modulus of elasticity of the contact portion are increased, thereby suppressing the wear of the contact portion.

CITATION LIST

Patent Document

PATENT DOCUMENT 1: Japanese Patent No. 2972104

SUMMARY OF THE INVENTION

Technical Problem

Now, with a high-load drive V-belt having such a configuration as described above, the contact portion of each block receives a shock from a pulley when contacting the pulley, and the shock-absorbing property (cushioning property) against the shock from the pulley decreases, thereby decreasing the shock resistance of the block, as the thickness of the contact portion decreases. Therefore, as described above, the shock resistance of the block is relatively low when the thickness of the contact portion of the block is relatively small, i.e., 0.5 mm or more and 0.8 mm or less.

In addition, the shock resistance of the block further decreases as the thickness of the contact portion decreases through the wear from a belt run. Particularly, when the thickness of the contact portion becomes smaller than 0.4 mm, the shock-absorbing property of the contact portion tends to decrease rapidly, thereby significantly decreasing the shock resistance of the block. Therefore, due to the shock occurring as each block of the high-load drive V-belt enters and exits the pulley during a belt run, it becomes more likely that the contact portion of the block chips off, thus shortening the lifetime of the belt.

Now, one may consider improving the shock resistance of the block by lowering the modulus of elasticity of the resin forming the contact portion. However, when the modulus of elasticity of the contact portion is lowered, the power transmission property and the wear resistance of the belt decrease, thereby lowering the performance of the belt itself.

That is, since the material characteristics (the modulus of elasticity, etc.) of the resin of the contact portion are dictated by the power transmission property and the wear resistance needed for the drive belt, the approach of improving the shock resistance of the block by changing the material characteristics of the resin is in a trade-off relationship with the power transmission property and the wear resistance. Therefore, by adjusting the material characteristics of the contact portion of the block of the V-belt as described in Patent Document 1, it is difficult to improve the shock resistance of the block to suppress the chipping of the contact portion of the block without lowering the power transmission property, the wear resistance, etc., of the belt.

The present invention has been made in view of these problems, and has an object to improve the shock resistance of the block without lowering the power transmission property and the wear resistance of the belt while suppressing separation of the contact portion of the block of the high-load drive V-belt off of the reinforcing member.

Solution to the Problem

In order to achieve the object set forth above, in the present invention, a thickness of a contact portion of a block of a high-load drive V-belt in a direction perpendicular to a contact surface is set to 1.0 mm or more and 1.8 mm or less.

Specifically, the present invention is directed to a high-load drive V-belt including: at least one tension band extending in an endless loop; and a plurality of blocks engaged and secured to the tension band at a predetermined pitch in a belt length direction of the tension band, wherein the plurality of blocks are each formed by a reinforcing member and a resin on both sides of the reinforcing member in a belt width direction, and each include a contact portion having a contact surface to be in contact with a pulley. A thickness of the contact portion in a direction perpendicular to the contact surface is 1.0 mm or more and 1.8 mm or less.

Functions

Now, the shock-absorbing property (cushioning property) of the contact portion of the block of the high-load drive V-belt is improved as the thickness of the contact portion in the direction perpendicular to the contact surface (the thickness of the contact portion) is larger. Therefore, the shock force from the pulleys acting upon the interface between the reinforcing member and the contact portion is more efficiently absorbed and dispersed, hence reduced, by the contact portion as the thickness of the contact portion is larger. That is, the shock resistance of the contact portion is improved as the thickness of the contact portion is larger. On the other hand, the shear stress at the interface between the reinforcing member and the contact portion of the block increases as the thickness of the contact portion is larger.

If the thickness of the contact portion is smaller than 1.0 mm, the shock-absorbing property of the contact portion will be relatively low, and the shock resistance of the block will be relatively low. Then, the contact portion of the block is likely to chip off due to the shock occurring when the block enters and exits the pulleys during a belt run. Moreover, as the belt runs, the contact surface wears, and it is likely that the thickness of the contact portion becomes smaller than 0.4 mm. Here, there is a tendency that the shock-absorbing property of the contact portion decreases rapidly when the thickness of the contact portion is smaller than 0.4 mm than when it is 0.4 mm or more. Therefore, when the thickness of the contact portion becomes smaller than 0.4 mm, the shock resistance of the contact portion decreases significantly so that the block is even more likely to chip off at the contact portion.

On the other hand, if the thickness of the contact portion is larger than 1.8 mm, the shear stress produced at the interface between the reinforcing member and the contact portion of the block during a belt run increases and may possibly exceed the stress tolerance of the contact portion due to the relatively large thickness of the contact portion. Then, the entire contact portion may come off of the reinforcing member, thus breaking the block.

In contrast, the high-load drive V-belt of the present invention is formed so that the thickness of the contact portion in the direction perpendicular to the contact surface is 1.0 mm or more and 1.8 mm or less. Therefore, by improving the shock-absorbing property of the contact portion while suppressing the increase in the shear stress produced at the interface between the reinforcing member and the contact portion, the shock force on the block is reduced by the contact portion, thereby improving the shock resistance of the block. Moreover, even if the thickness of the contact portion decreases due to the wear of the contact surface from a belt run, the contact portion has a relatively large thickness of 0.4 mm or more over a long period of time, thereby suppressing a significant decrease in the shock resistance of the block. Therefore, with such a configuration, it is possible to suppress the separation of the contact portion off of the reinforcing member in the block of the high-load drive V-belt, and to improve the shock resistance of the block without decreasing the power transmission property or the wear resistance of the belt.

Advantages of the Invention

According to the present invention, the thickness of the contact portion of the block of the high-load drive V-belt in the direction perpendicular to the contact surface is 1.0 mm or more and 1.8 mm or less, and it is therefore possible to improve the shock resistance of the block while suppressing an increase in the shear stress produced at the interface between the reinforcing member and the contact portion in the block. Moreover, even if the thickness of the contact portion decreases due to the wear of the contact surface from a belt run, the contact portion has a relatively large thickness of 0.4 mm or more over a long period of time, thereby suppressing a significant decrease in the shock resistance of the block. Therefore, it is possible to suppress the separation of the contact portion off of the reinforcing member in the block, and to improve the shock resistance of the block without decreasing the power transmission property or the wear resistance of the belt.

BRIEF DESCRIPTION OF THE DRAWINGS

FIG. 7 shows measurement results, measured in a first example, of the shock resistance, the power transmission property, the high-speed durability and the wear for each V-belt.

DESCRIPTION OF REFERENCE CHARACTERS

B High-load drive V-belt (V-belt)
10 Tension band
20 Block
27 Reinforcing member
28 Contact portion
30 Contact surface

DESCRIPTION OF EMBODIMENTS

An embodiment of the present invention will now be described with reference to the drawings. Note that the present invention is not limited to the following embodiment.

Figure 1:
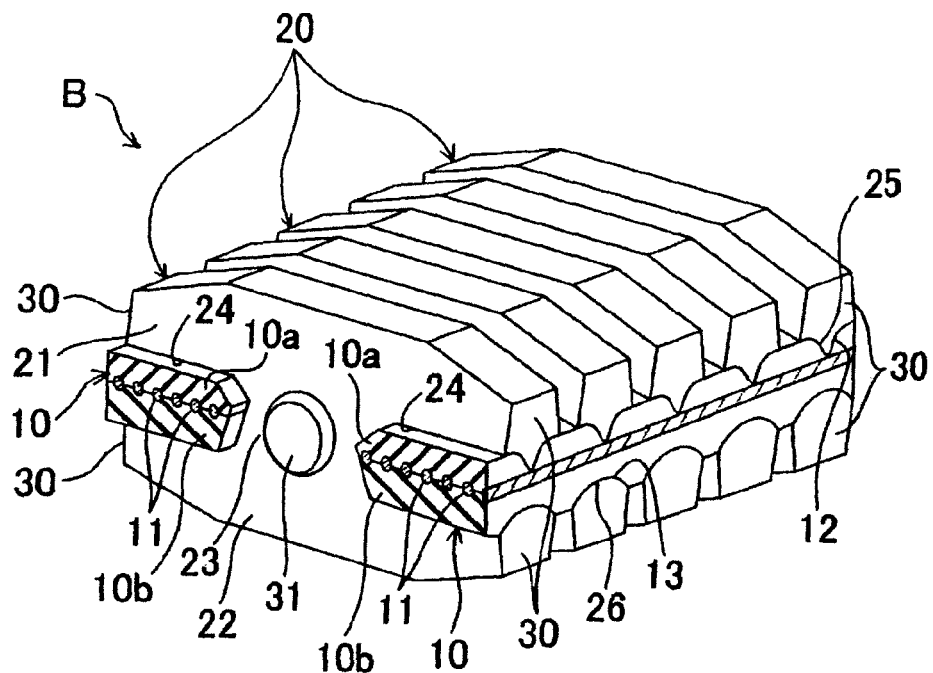
FIG. 1 is a perspective view generally showing a portion of a high-load drive V-belt according to Embodiment 1 of the present invention.
Figure 2:
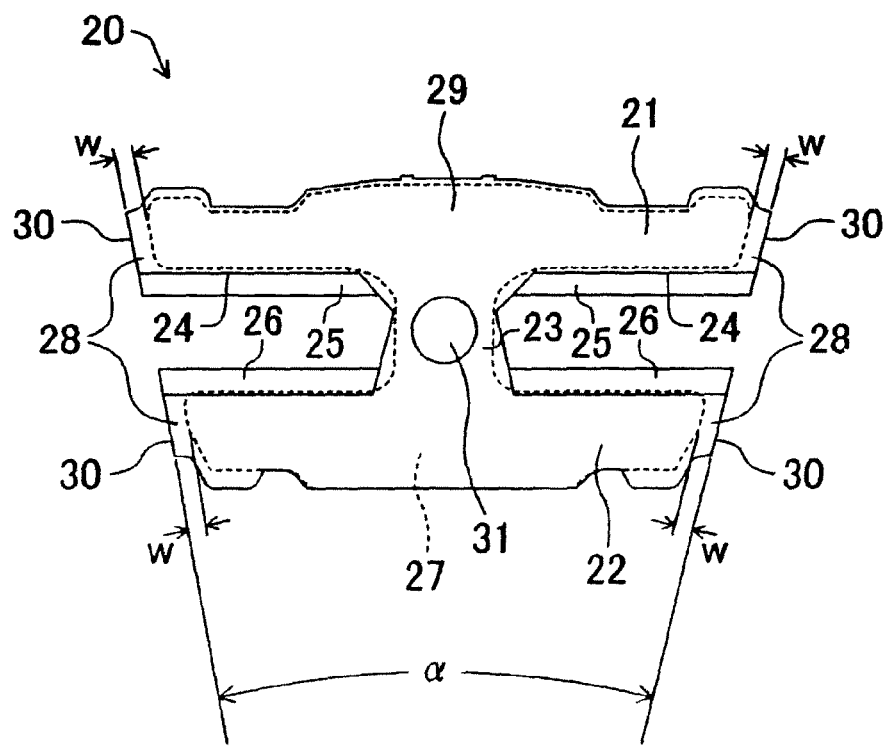
FIG. 2 is a front view generally showing a configuration of a block of the high-load drive V-belt.

FIGS. 1 and 2 generally show a configuration of a high-load drive V-belt B according to the embodiment of the present invention. That is, FIG. 1 is a perspective view generally showing a portion of the high-load drive V-belt B, and FIG. 2 is a front view generally showing a block 20 of the high-load drive V-belt B.

As shown in FIG. 1, the high-load drive V-belt (hereinafter also referred to simply as a "V-belt") B includes a pair of tension bands 10 each extending in an endless loop, and a plurality of blocks 20 engaged and secured thereto at a predetermined pitch in the belt length direction of the pair of tension bands 10 with the pair of tension bands 10 arranged side-by-side in the belt width direction.

The pair of tension bands 10 each include an outer rubber layer 10a and an inner rubber layer 10b provided on the belt outer side and on the belt inner side, respectively, so as to extend side-by-side in the belt length direction, and a plurality of cores 11 provided between the outer rubber layer 10a and the inner rubber layer 10b.

The outer rubber layer 10a includes an outer fabric layer (not shown) provided integral with the outer rubber layer 10a on the surface of the belt outer side. On the other hand, the inner rubber layer 10b includes an inner fabric layer (not shown) provided integral with the inner rubber layer 10b on the surface of the belt inner side. The outer rubber layer 10a and the inner rubber layer 10b are made of, for example, a hard rubber material, or the like, containing a short fiber of an aramid fiber, a nylon fiber, or the like, in a hydrogenated nitrile rubber (H-NBR) mixed with zinc methacrylate.

The plurality of cores 11 are arranged at a predetermined interval in the belt width direction while extending in the belt length direction. Each core 11 is formed by, for example, an aramid fiber, or the like, and has a relatively high strength and a relatively high modulus of elasticity.

A plurality of outer grooves 12 are formed, as the outer receiving portions, arranged at a predetermined interval in the belt length direction while extending in the belt width direction to form a U-shaped cross section on the surface of the belt outer side of the tension band 10. On the other hand, a plurality of inner grooves 13 extending in the belt width direction to form an arc-shaped cross section are foamed, as the inner receiving portions, on the surface of the belt inner side of the tension band 10. Note that these inner grooves 13 are formed at a predetermined interval at positions opposing the outer grooves 12 in the belt thickness direction.

As shown in FIG. 2, the plurality of blocks 20 are formed so that each block has a generally H-letter shape as viewed from the surface (front surface) opposing an adjacent block 20. That is, each block 20 includes an outer beam portion 21 forming the belt outer surface, an inner beam portion 22 forming the belt inner surface, and a center pillar portion 23 provided between the outer beam portion 21 and the inner beam portion 22 for connecting between the outer beam portion 21 and the inner beam portion 22.

That is, the outer beam portion 21 and the inner beam portion 22 are each formed so that the dimension thereof in the belt width direction is larger than the dimension of the center pillar portion 23 in the belt width direction. The center pillar portion 23 is provided so as to connect together the central portion of the outer beam portion 21 in the belt width direction and the central portion of the inner beam portion 22 in the belt width direction.

Then, on the opposite sides of the center pillar portion 23 in the belt width direction, a pair of slit-shaped fitting portions 24 are formed, which open outwardly in the belt width direction and are defined by the outer beam portion 21 and the inner beam portion 22. The tension band 10 is pressed into each of the pair of fitting portions 24, thereby fitting the tension bands 10 into the blocks 20.

That is, the fitting portion 24 includes, as the outer mating portions, outer rib portions 25 on the wall surface on the belt outer side, which are ribs mating with the outer grooves 12 of the tension bands 10, and includes, as the inner mating portions, inner rib portions 26 on the wall surface on the belt inner side, which are ribs mating with the inner grooves 13 of the tension bands 10. The outer rib portions 25 and the inner rib portions 26 are provided at positions opposing each other in the belt thickness direction. Thus, the outer rib portions 25 mate with the outer grooves 12 and the inner rib portions 26 mate with the inner grooves 13 so that the plurality of blocks 20 are engaged and secured to the tension bands 10 in the belt length direction.

The block 20 includes a convex portion 31 formed to protrude from one surface thereof in the belt length direction, and a concave portion (not shown) formed on the other surface thereof in the belt length direction which is engaged with the convex portion 31 of an adjacent block 20. The concave portion and the convex portion 31 are formed along the pitch line of the center pillar portion 23.

The concave portion is formed with, for example, an arc-shaped cross section and is formed in a tapered shape such that the inner diameter thereof gradually decreases toward the bottom surface side. On the other hand, the convex portion 31 is formed with an arc-shaped cross section and is formed in a tapered shape such that the outer diameter thereof gradually decreases toward the tip side.

With such a configuration, in the high-load drive V-belt B, the convex portion 31 of one of blocks 20 adjacent to each other in the belt length direction is engaged with the concave portion of the other block 20, thereby restricting the shaking of the blocks 20 in the belt thickness direction and the belt width direction. Thus, the high-load drive V-belt B provides power transmission by transferring the driving force from the pulleys to the tension bands 10 via a contact portion 28.

Hereinafter, the configuration of the block 20 will be described in detail.

Each block 20 includes a reinforcing member 27, and the contact portions 28 formed by a resin on both sides of the reinforcing member 27 in the belt width direction and including contact surfaces 30 to be in contact with the pulleys.

That is, each block 20 includes the reinforcing member 27 buried in a resin member so as to be positioned generally at the center of the block 20. That is, each block 20 includes a resin portion 29 formed by a phenol resin, or the like, for example, and the reinforcing member 27 buried in the resin portion 29. The reinforcing member 27 is formed by an aluminum alloy, or the like, for example, and is formed in a generally H-letter shape which is generally equal to the outline shape of the block 20. The resin portion 29 is formed so as to cover the entire surface or generally the entire surface of the reinforcing member 27.

Note that the phenol resin is, for example, a novolac-, resol- or benzilic ether-type phenol resin, or the like, and these phenol resins may be either modified or unmodified. A modified phenol resin may be, for example, an alkyl-modified phenol resin, a tall oil-modified phenol resin, or the like. More preferably, it may be, for example, a phenol resin modified with a cardol, or the like, i.e., a cashew oil, or at least one of a cardol, an anacardic acid and a cardanol contained in a cashew oil. Each of the phenol resins may be used solely or in combination with others. Particularly, where an unmodified phenol resin and a phenol resin modified with a cardol, or the like, are used in combination, the mixing ratio therebetween may be selected appropriately.

The outer beam portion 21 and the inner beam portion 22 are obtained by covering the entire surface of the opposite sides of the reinforcing member 27 in the belt width direction with the resin portion 29. The contact portion 28 is provided by the resin portion 29 formed on opposite sides of the reinforcing member 27 in the belt width direction in the outer beam portion 21 and in the inner beam portion 22. That is, the contact portion 28 is formed by a phenol resin.

Here, assuming that the modulus of elasticity of the contact portion 28 at room temperature is less than 9000 MPa, the mechanical strength of the contact portion 28 is relatively small, making it difficult to efficiently transfer the driving force from the pulley to the tension band 10 during a belt run. Thus, it is preferred that the contact portion 28 is formed by a material whose modulus of elasticity at room temperature is 9000 MPa or more. That is, it is preferred that the resin portion 29 is formed by a resin material whose modulus of elasticity at room temperature is 9000 MPa or more.

The outer surface (the surface opposite to the reinforcing member 27) of the contact portion 28 forms the contact surface 30 to be in contact with the pulleys. That is, each block 20 has contact surfaces 30 on opposite surfaces thereof in the belt width direction in the outer beam portion 21 and in the inner beam portion 22.

Now, the shock-absorbing property (cushioning property) of the contact portion 28 against the shock from the pulleys is improved as the thickness w of the contact portion 28 in the direction perpendicular to the contact surface 30 (hereinafter also referred to simply as "the thickness of the contact portion 28") is larger. Therefore, the shock force from the pulleys acting upon the interface between the reinforcing member 27 and the contact portion 28 is more efficiently absorbed and dispersed, hence reduced, by the contact portion 28 as the thickness w of the contact portion 28 is larger. That is, the shock resistance of the contact portion 28 (the block 20) is improved as the thickness w of the contact portion 28 is larger. On the other hand, the shear stress at the interface between the reinforcing member 27 and the contact portion 28 increases as the thickness w of the contact portion 28 is larger.

If the thickness w of the contact portion 28 is smaller than 1.0 mm, the shock-absorbing property of the contact portion 28 will be low, and the shock resistance of the block 20 will be low. Then, the contact portion 28 of the block 20 is likely to chip off due to the shock occurring when the block 20 enters and exits the pulleys during a belt run. Moreover, as the belt B runs, the contact surface 30 wears to decrease the thickness w of the contact portion 28, thereby increasing the possibility that the thickness w is smaller than 0.4 mm. Here, there is a tendency that the shock-absorbing property of the contact portion 28 decreases rapidly when the thickness w of the contact portion 28 is smaller than 0.4 mm as compared with when it is 0.4 mm or more. Therefore, the shock resistance of the contact portion 28 decreases significantly so that the block 20 is even more likely to chip off at the contact portion 28.

On the other hand, if the thickness w of the contact portion 28 is larger than 1.8 mm, the shear stress produced at the interface between the reinforcing member 27 and the contact portion 28 during a belt run increases and may possibly exceed the stress tolerance of the contact portion 28, in which case the entire contact portion 28 is likely to come off of the reinforcing member 27, thus breaking the block 20.

In view of the above, the contact portion 28 is formed so that the thickness w in the direction perpendicular to the contact surface 30 is 1.0 mm or more and 1.8 mm or less. That is, in the outer beam portion 21 and in the inner beam portion 22, the resin portion 29 formed on opposite sides of the reinforcing member 27 in the belt width direction has a thickness w in the direction perpendicular to the contact surface 30 that is 1.0 mm or more and 1.8 mm or less.

The outer beam portion 21 and the inner beam portion 22 are formed so that the dimension thereof in the belt width direction decreases from the belt outer side surface toward the belt inner side. The angle between the contact surface 30 of the outer beam portion 21 and that of the inner beam portion 22 is equal to the angle between pulley groove surfaces of the V pulleys (not shown) around which the V-belt B is wrapped.

Now, if the kinetic friction coefficient between the contact surface 30 and the pulley surface is smaller than 0.16, it will be difficult to sufficiently receive the driving force from the pulleys at the contact portion 28, making it difficult to ensure a sufficient power transmission property as a drive belt because of the relatively small kinetic friction coefficient between the contact surface 30 and the pulley surface.

On the other hand, if the kinetic friction coefficient between the contact surface 30 and the pulley surface is larger than $\tan(\alpha/2)$ where $\alpha$ is the angle between the contact surfaces 30 on opposite sides of the block 20 in the belt width direction, the belt is likely to be caught by a pulley when it leaves the pulley due to the relatively large kinetic friction coefficient between the contact surface 30 and the pulley surface. If the belt is caught by a pulley, it increases the noise of the belt running and applies a more than necessary load on the belt, thus making it more likely for the belt to break.

Thus, the kinetic friction coefficient between the contact surface 30 and the pulley surface is set to be 0.16 or more and $\tan(\alpha/2)$ or less.

Advantages of the Embodiment

Therefore, according to this embodiment, the thickness w of the block 20 of the high-load drive V-belt B in the direction perpendicular to the surface of the contact surface 30 of the contact portion 28 is 1.0 mm or more and 1.8 mm or less. Therefore, by improving the shock-absorbing property of the contact portion 28 while suppressing the increase in the shear stress produced at the interface between the reinforcing member 27 and the contact portion 28, it is possible to absorb and disperse the shock on the contact surface 30 by the contact portion 28, thus increasing the shock resistance of the contact portion 28. Moreover, even if the thickness w of the contact portion 28 decreases due to the wear of the contact surface 30 from a belt run, the contact portion 28 has a relatively large thickness of 0.4 mm or more over a long period of time, thereby suppressing a significant decrease in the shock resistance of the block 20. Therefore, it is possible to suppress the separation of the contact portion 28 off of the reinforcing member 27, and to improve the shock resistance of the block 20 without decreasing the power transmission property or the wear resistance of the belt.

Other Embodiments

In the above embodiment, the resin portion 29 forming the contact portion 28 is formed by a phenol resin and has a modulus of elasticity of 9000 MPa or more at room temperature. However, the present invention is not limited thereto, and the resin portion 29 may be formed by a resin other than a phenol resin, and the modulus of elasticity thereof may be smaller than 9000 MPa.

In the above embodiment, the kinetic friction coefficient between the contact surface 30 and the pulley surface is 0.16 or more and tan ($\alpha$/2) or less where $\alpha$ is the angle between the contact surfaces 30 on opposite sides of the block 20 in the belt width direction. However, the present invention is not limited thereto, and the kinetic friction coefficient between the contact surface 30 and the pulley surface may be of any other suitable value as long as it is possible to sufficiently ensure the power transmission property as a drive belt.

In the above embodiment, the high-load drive V-belt B includes a pair of tension bands 10. However, the present invention is not limited thereto, and it is only required that the high-load drive V-belt B includes at least one tension band 10.

EXAMPLES

First Example

In the first example, high-load drive V-belts B of Examples 1-4 were produced, each having such a structure as shown in the above embodiment, and each V-belt B or the block 20 thereof was subjected to a shock resistance test, a power transmission test and a high-speed durability test.

The V-belts B of Examples 1-4 differ from one another in terms of the thickness w of the contact portion 28. Specifically, the thickness w of the contact portion 28 is 1.0 mm, 1.2 mm, 1.5 mm and 1.8 mm for the V-belts B of Examples 1-4, respectively. The modulus of elasticity of the contact portion 28 at room temperature is 20000 MPa for the V-belts B of Examples 1-4.

V-belts of Comparative Examples 1-4, as opposed to Examples 1-4, differing from one another in terms of the thickness w of the contact portion 28 were produced, and subjected to the same tests as those for the V-belts B of Examples 1-4. That is, the thickness w of the contact portion 28 is 0.3 mm, 0.5 mm, 0.8 mm and 2.0 mm for the V-belts of Comparative Examples 1-4, respectively, and the configuration thereof is otherwise similar to those of the V-belts B of Examples 1-4. Note that in the following description, like reference numerals to those of Examples 1-4 will be used also for the V-belts of Comparative Examples 1-4 for ease of understanding.

Next, the test apparatus and the test method for the shock resistance test, the power transmission test and the high-speed durability test will be described.

Figure 3:
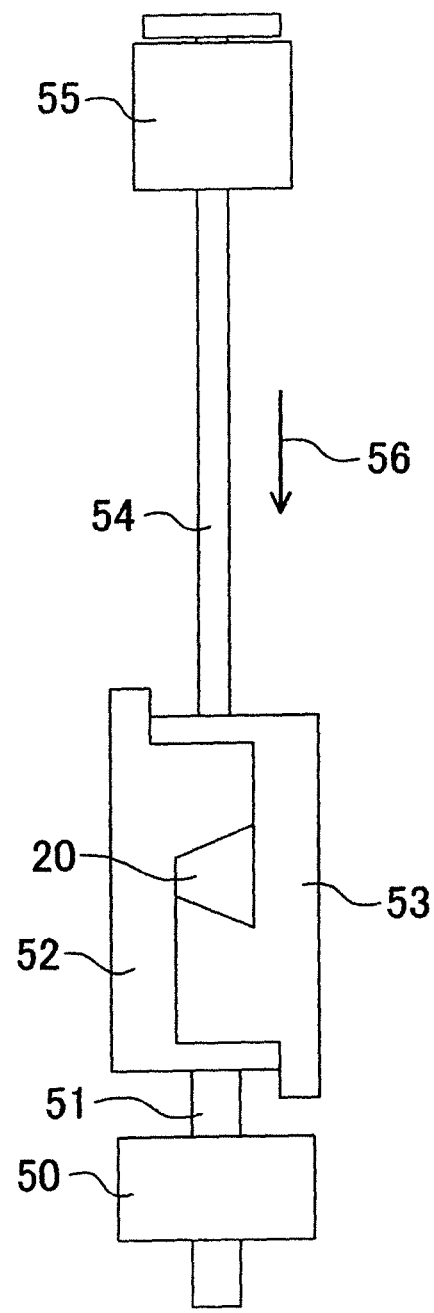
FIG. 3 is a diagram generally showing a configuration of a test apparatus for an shock resistance test for a block.

In the shock resistance test, a shock resistance test apparatus shown in FIG. 3 was used to measure the shock resistance of the block 20 for V-belts of Examples 1-4 and Comparative Examples 1-4. The shock resistance test apparatus includes a load cell 50, a first pressure receiving member 52 of a generally C-letter shape connected to the load cell 50 via a member 51, a second pressure receiving member 53 of a generally inverse C-letter shape engaged with the first pressure receiving member 52, a pillar-like guide member 54 connected to one side of the second pressure receiving member 53 that is opposite to the load cell 50, and a weight 55 configured so that it can drop along the guide member 54. Note that reference numeral 56 in FIG. 3 denotes the direction in which the weight 55 drops.

The first pressure receiving member 52 and the second pressure receiving member 53 are configured so that the block 20 of the V-belt can be held therebetween with no gap between the block 20 and the first and second pressure receiving members 52 and 53. The weight 55 is configured so that it can drop along the guide member 54 to impart a shock to the second pressure receiving member 53.

With such a configuration, the weight 55 is allowed to drop onto the second pressure receiving member 53 with the block 20 held between the first pressure receiving member 52 and the second pressure receiving member 53. Thus, it is possible to impart a shock from the weight 55 to the contact portion 28 of the block 20. Then, the number of times the weight 55 was dropped before the contact portion 28 of the block 20 chips off was measured, and the number of times the weight 55 was dropped was evaluated as the shock resistance of the block 20.

Note that in the shock resistance test, the weight 55 was allowed to drop onto the second pressure receiving member 53 from 15 mm above the second pressure receiving member 53. The dropping frequency was set to 20 reps per minute. The atmospheric temperature is 13° C.

Figure 4:
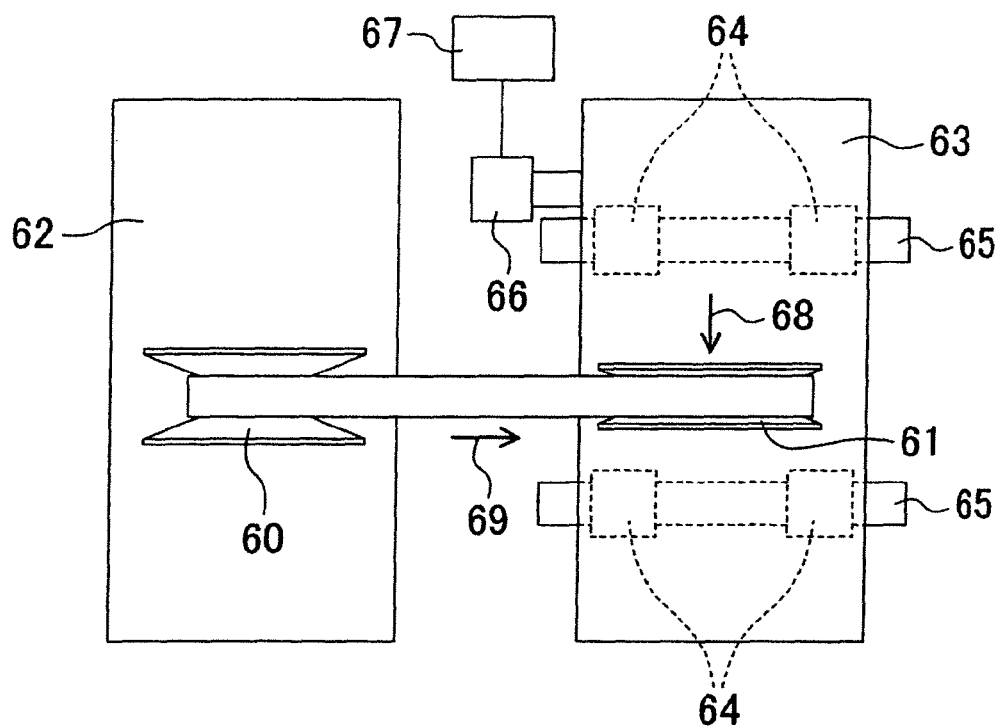
FIG. 4 is a top view generally showing a configuration of a power drive device for a power transmission test.
Figure 5:
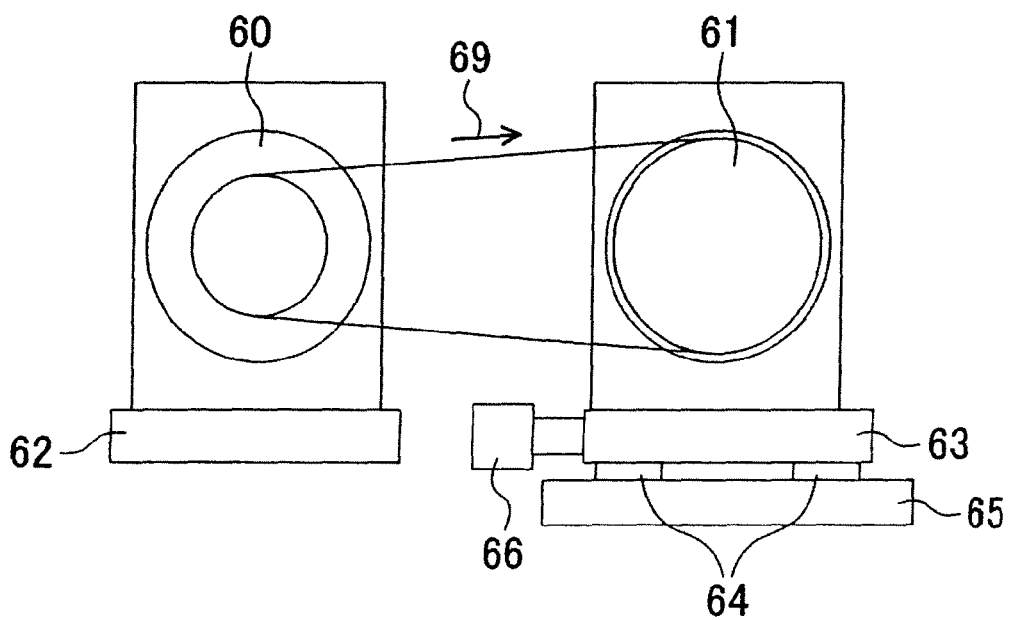
FIG. 5 is a front view generally showing a configuration of a power drive device for a power transmission test.

As shown in FIGS. 4 and 5, in the power transmission test, the V-belts of Examples 1-4 and Comparative Examples 1-4 were each wrapped around a drive pulley 60 and a driven pulley 61 and allowed to run for 300 hours, after which the tension of the belt was measured after the belt run. Then, the tension of the belt after the belt run was compared with that measured before the belt run, and the result was evaluated as the power transmission property of the belt. Note that reference numeral 67 in FIGS. 4 and 5 denotes the belt traveling direction.

First, the belt driving apparatus and the method for measuring the tension of the belt for use in this power transmission test will be described.

In the belt driving apparatus used in this power transmission test, the drive pulley 60 is fixed on a base plate 62, and the driven pulley 61 is fixed on a base plate 63. The base plate 63 on which the driven pulley 61 is fixed is placed on a pair of L/M guides 65 via bearings 64 attached to the lower surface of the base plate 63.

The pair of L/M guides 65 are arranged side-by-side in the rotation axis direction of the driven pulley so as to extend in the belt length direction of the belt wrapped around the drive pulley 60 and the driven pulley 61. Thus, the base plate 63 provided on the L/M guides 65 via the bearings 64 can move in the belt length direction of the belt along the L/M guides 65. A load cell 66 fixed on a plate (not shown) is arranged on the outer side of the base plate 63 toward the drive pulley 60. The load cell 66 is connected to a recorder 67 so that the tension measured by the load cell 66 is recorded by the recorder 67.

The driven pulley 61 is configured so that the pulley groove width can be narrowed by applying a certain driving force in the rotation axis direction by means of a spring torque cam (not shown). Thus, it is possible to give a tension to the belt. Reference numeral 68 in FIG. 4 denotes the direction in which the certain driving force is applied.

With such a configuration, in the belt driving apparatus, the tension of the belt wrapped around the drive pulley 60 and the driven pulley 61 generates a force that moves the driven pulley 61 toward the drive pulley 60. Therefore, by measuring this force as a compressive force acting upon the load cell 66, the tension of the belt can be measured.

In the belt driving apparatus, the pulley diameter of the drive pulley 60 is 73.23 mm, and the pulley diameter of the driven pulley 61 is 124.49 mm. The interval between the rotation axis of the drive pulley 60 and the rotation axis of the driven pulley 61 was set to 148.5 mm. The belt temperature during the test was 130° C.

Figure 6:
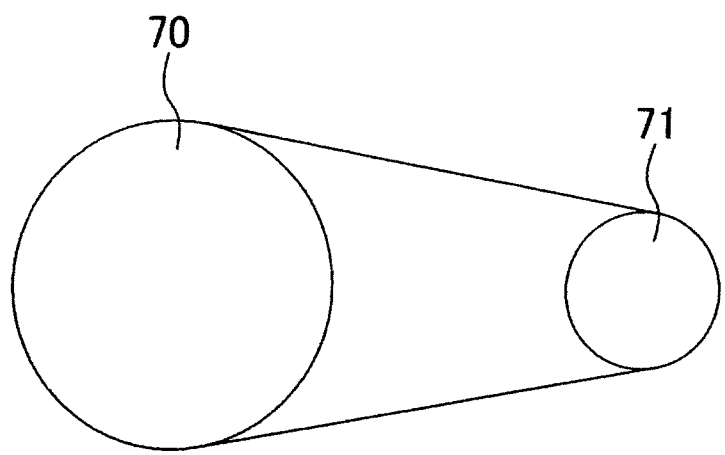
FIG. 6 is a diagram schematically showing a configuration of a test apparatus for a high-speed durability test.

As shown in FIG. 6, in the high-speed durability test, the V-belts of Examples 1-4 and Comparative Examples 1-4 were each wrapped around a drive pulley 70 and a driven pulley 71 and allowed to run for 500 hours so as to measure the amount of time over which the V-belt can run and evaluate the amount of time as the high-speed durability.

In the high-speed durability test, the pulley diameter of the drive pulley 70 is 133.6 mm, and the pulley diameter of the driven pulley 71 is 61.4 mm. The number of revolutions of the drive pulley 70 was set to 5016±60 rpm, and the torque of the drive pulley 70 to 63.7 N·m. The atmospheric temperature during the test was set to 120° C.

Each V-belt was allowed to run for 300 hours under similar conditions to those of the high-speed durability test, after which the thickness w of the contact portion 28 of the V-belt was measured and compared with that measured before the belt run, thereby obtaining the wear of the contact portion 28 of the V-belt.

FIG. 7 shows the results of the shock resistance test, the power transmission test and the high-speed durability test for the V-belts of Examples 1-4 and Comparative Examples 1-6.

A comparison between the number of times the weight 55 is dropped before the block 20 chips off (the shock resistance) before a belt run and that after the belt run, obtained in the shock resistance test, for Comparative Example 2 and Comparative Example 3 indicates that the number of times the weight 55 is dropped after the run is significantly lower than the number of times the weight 55 is dropped before the run. Note that for Comparative Example 1, the contact portion 28 reduced through wear so much that the reinforcing member 27 was exposed during the high-speed durability test. Therefore, it was not possible to carry out the shock resistance test after the belt run, and it was impossible to measure the number of times the weight 55 is dropped after the run.

For the V-belts of Comparative Examples 1-3, the power transmission test showed that the tension (the power transmission property in the figure) after a run was lower than that before the run. In addition, for Comparative Example 2 and Comparative Example 4, in the high-speed durability test, the reinforcing member 27 was exposed or the block 20 broke, thus disabling further running, at a running time of 400 hours or less.

In contrast, for the blocks 20 of Examples 1-4, the number of times the weight 55 is dropped before the block 20 chips off in the shock resistance test was 3000 or more both before and after the belt run, and even a comparison between before and after the belt run did not indicate as significant a decrease as that with the blocks 20 of Comparative Examples 1-3. Particularly, for the blocks 20 of Example 3 and Example 4, the number of times the weight 55 is dropped before the block 20 chips off in the shock resistance test is the same before and after the belt run.

For the belts of Examples 1-4, in the power transmission test, the belt tension (the power transmission property) after the run is the same as that before the run, indicating that the belt tension did not decrease even after running over 300 hours. Moreover, the belts of Examples 1-4 ran with no problems even after running over 500 hours in the high-speed durability test.

It can be seen from the above that as long as the thickness w of the contact portion 28 is 1.0 mm-1.8 mm (Examples 1-4), it is possible to ensure a sufficient level of performance for all of the shock resistance, the power transmission property, the high-speed durability and the wear resistance. Particularly, since the decrease in the shock resistance through a belt run is smaller when the thickness w of the contact portion 28 is 1.2 mm (Example 2) than when it is 1 mm (Example 1), it is preferred that the thickness w is 1.2 min-1.8 mm. Moreover, since the shock resistance does not change through a belt run when the thickness w of the contact portion 28 is 1.5 mm-1.8 mm (Examples 3 and 4), it is more preferred that the thickness w is 1.5 mm-1.8 mm.

Second Example

In the second example, a plurality of blocks 20 were produced, each having such a structure as shown in the above embodiment, and each block 20 was subjected to a shock resistance test of the first example. The plurality of blocks 20 included two each (a total of 16) of blocks having the same thickness w or substantially the same thickness w of the contact portion 28 of 1.8 mm or less.

Figure 8:
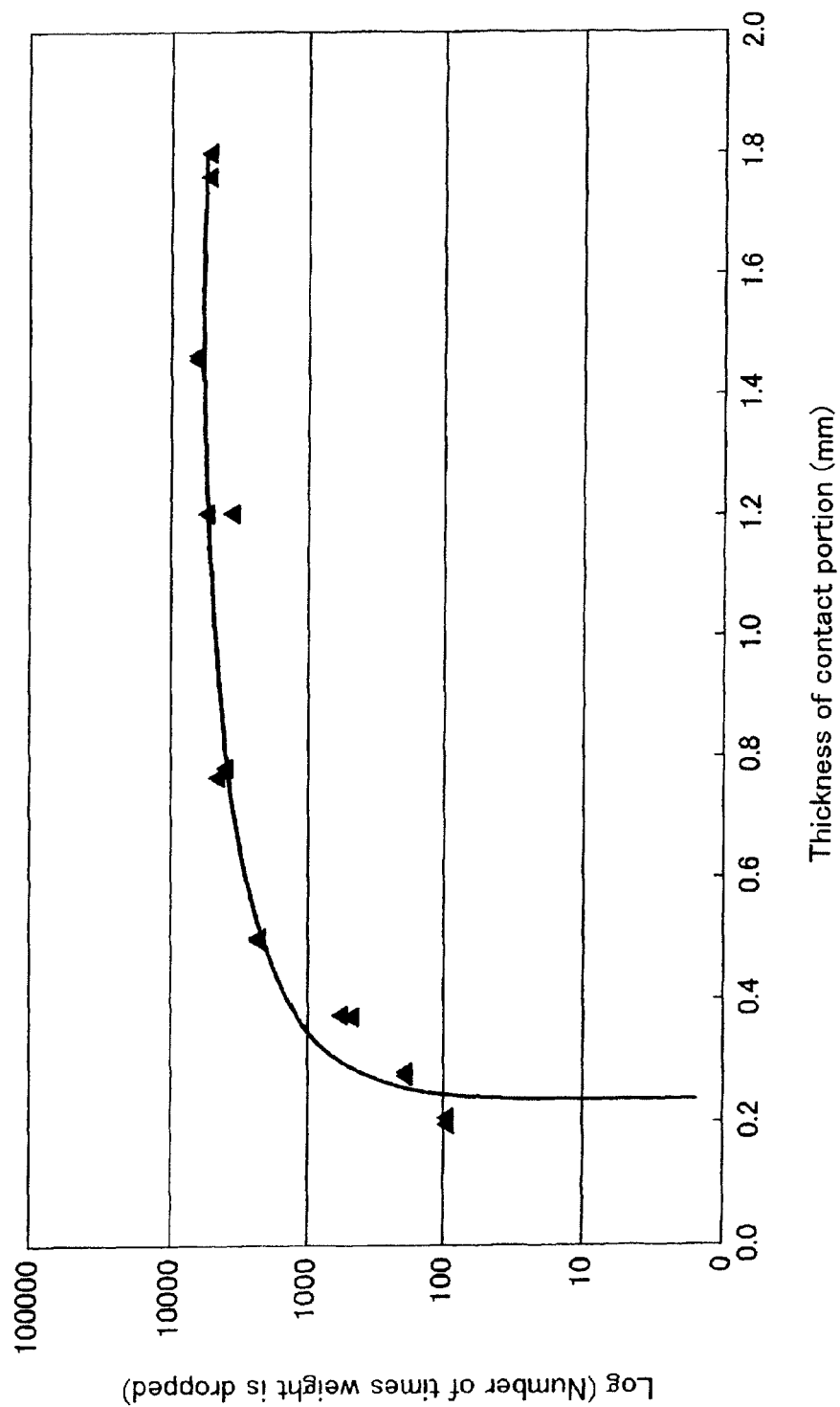
FIG. 8 is a graph showing the change of the number of times a weight is dropped with respect to the thickness of the contact portion.

FIG. 8 shows the results of the shock resistance test. FIG. 8 shows the change of the number of times the weight 55 is dropped with respect to the thickness w of the contact portion 28. As shown in FIG. 8, there is a tendency that for blocks 20 of which the thickness w of the contact portion 28 is smaller than 1.0 mm, the number of times the weight 55 is dropped before the contact portion 28 chips off decreases as the thickness w is smaller. Particularly, for blocks 20 of which the thickness w of the contact portion 28 is smaller than 0.4 mm, the number of times the weight 55 is dropped before the contact portion 28 chips off is significantly smaller than that for blocks 20 of which the thickness w of the contact portion 28 is 0.4 mm or more. In contrast, for blocks 20 of which the thickness w of the contact portion 28 is 1.0 mm or more and 1.8 mm or less, the number of times the weight 55 is dropped before the contact portion 28 chips off is stably large.

It was found from the above that where the thickness w of the contact portion 28 is smaller than 0.4 mm, the shock resistance of the block 20 is significantly low. It was also found that by setting the thickness w of the contact portion 28 to 1.0 mm or more and 1.8 mm or less, it is possible to improve the shock resistance of the contact portion 28 and to suppress the chipping of the contact portion 28 of the block 20 without lowering the power transmission property or the wear resistance of the belt.

INDUSTRIAL APPLICABILITY

As described above, the present invention is useful as a high-load drive V-belt, and is particularly suitable for improving the shock resistance of the block without lowering the power transmission property or the wear resistance of the belt while suppressing the separation of the contact portion off of the reinforcing member.

The invention claimed is:
1. A high-load drive V-belt comprising:
at least one tension band extending in an endless loop; and
a plurality of blocks engaged and secured to the tension band at a predetermined pitch in a belt length direction of the tension band, wherein
the plurality of blocks are each formed by a reinforcing member and a resin on both sides of the reinforcing member in a belt width direction, and each include a contact portion having a contact surface to be in contact with a pulley, and
a thickness of the contact portion in a direction perpendicular to the contact surface is more than 1.2 mm up to a value of 1.8 mm.

* * * * *